United States Patent
Weber

(10) Patent No.: US 11,878,868 B2
(45) Date of Patent: Jan. 23, 2024

(54) LINER SHEET, REPLACEMENT LINER, CONVEYOR PAN, CONVEYOR, AND LINER REPLACEMENT METHOD

(71) Applicant: Caterpillar Inc., Peoria, IL (US)

(72) Inventor: William R Weber, Allison Park, PA (US)

(73) Assignee: Caterpillar Inc., Peoria, IL (US)

( * ) Notice: Subject to any disclaimer, the term of this patent is extended or adjusted under 35 U.S.C. 154(b) by 24 days.

(21) Appl. No.: 17/654,836

(22) Filed: Mar. 15, 2022

(65) Prior Publication Data

US 2023/0294925 A1    Sep. 21, 2023

(51) Int. Cl.
*B65G 21/20* (2006.01)
*B65G 17/06* (2006.01)
*B65G 19/28* (2006.01)

(52) U.S. Cl.
CPC ....... *B65G 21/2081* (2013.01); *B65G 17/065* (2013.01); *B65G 19/285* (2013.01); *B65G 2201/045* (2013.01)

(58) Field of Classification Search
CPC .............. B65G 21/2081; B65G 17/065; B65G 19/285; B65G 2201/045
See application file for complete search history.

(56) References Cited

U.S. PATENT DOCUMENTS

| | | | |
|---|---|---|---|
| 4,842,128 A | 6/1989 | Tomlinson | |
| 6,401,912 B1* | 6/2002 | Bandy, Jr. | B65G 19/285 |
| | | | 198/860.3 |
| 7,032,743 B2* | 4/2006 | Vorsteher | B65G 19/285 |
| | | | 198/735.1 |
| 9,139,366 B2* | 9/2015 | Berroth | B65G 11/166 |
| 2009/0066147 A1* | 3/2009 | Tout | B65G 19/285 |
| | | | 299/43 |
| 2011/0139587 A1 | 6/2011 | Schmidt et al. | |

FOREIGN PATENT DOCUMENTS

| | | | | |
|---|---|---|---|---|
| DE | 10144825 A1 * | 3/2003 | ........... | B65G 19/285 |
| DE | 20315759 U1 | 12/2003 | | |
| DE | 10231875 B3 * | 2/2004 | ........... | B65G 19/285 |
| EP | 2631203 A1 * | 8/2013 | ........... | B65G 19/285 |

(Continued)

OTHER PUBLICATIONS

"Patent Translate Description DE 10 144 825 A" EPO (Year: 2023).*

(Continued)

*Primary Examiner* — Mark A Deuble

(57) ABSTRACT

The present invention pertains a replacement liner (10) for insertion in a conveyor pan (100) of a chain type conveyor (200), comprising a floor part (12) having a left connection surface (14) and a right connection surface (16), a left side part (18) having a left side part connection surface (20) connectable to the left connection surface (14), and a right side part (22) having a right side part connection surface (24) connectable to the right connection surface (16). The connection surfaces (14, 20, 16, 24) are configured to form, in a connected state, a form-fitted connection with their complementary connection surface (14, 20; 16, 24). The present invention further pertains to a conveyor pan (100), a chain type conveyor (200) comprising such, a liner replacement method and a liner sheet.

15 Claims, 8 Drawing Sheets

(56) References Cited

FOREIGN PATENT DOCUMENTS

GB        2185952 A  *  8/1987  ........... B65G 19/285
GB        2249293        5/1992

OTHER PUBLICATIONS

"Description DE 102 31 875" (Year: 2019).*
Anonymous: "Brinell scale—Wikipedia", en.wikipedia.org, Feb. 26, 2022 (Feb. 26, 2022), pp. 1-4, XP093053262, Retrieved from the Internet: URL:https://en.wikipedia.org/w/index.php?title=Brinell_scale&oldid=I074052780 [retrieved on Jun. 9, 2023] p. 3.
Written Opinion and International Search Report for Int'l. Patent Appln. No. PCT/US2023/063811, dated Jun. 22, 2023 (12 pgs).

* cited by examiner

US 11,878,868 B2

LINER SHEET, REPLACEMENT LINER, CONVEYOR PAN, CONVEYOR, AND LINER REPLACEMENT METHOD

TECHNICAL FIELD

The present disclosure pertains to a replacement liner for insertion in a conveyor pan of a chain type conveyor, in particular an overburden chain conveyor in the form of a gate conveyor. The present disclosure also relates to a conveyor pan for a chain type conveyor. In addition, the present disclosure relates to a chain type conveyor, in particular an overburden chain conveyor in the form of a gate conveyor. Further, the present disclosure relates to a liner replacement method for replacing the liner of a conveyor pan according to the present disclosure. Finally, the present disclosure relates to a liner sheet to be used in a replacement liner.

TECHNOLOGICAL BACKGROUND

In the process of reaching a dedicated mining ore, substantial amounts of overburden must be conveyed away. Overburden is oftentimes conveyed over long distances, where other previously stripped areas are being reclaimed.

Before the overburden is metered and placed on a long distance rubber belt type conveyor it is usually dumped onto a durable chain type conveyor using large 45 ton dump trucks. Such chain type conveyors oftentimes share some similarities to conventional underground chain type conveyors.

However, overburden near the coast can contain a significant amount of sand and broken shells, rendering it too abrasive even for chain type conveyors.

To address this issue, some approaches suggest utilizing liners to be placed on the surfaces of the conveyor. In some instances, such liners are welded onto the top race and bottom race.

However, while liners have been proven to mitigate overburden-driven abrasion of the conveyor, at some point, those liners are worn through and need to be replaced in a timely and efficient manner.

The replacement liner, the conveyor pan, the conveyor, and the liner replacement method of the present disclosure solve one or more problems set forth above.

SUMMARY OF THE INVENTION

Starting from the prior art, it is an objective to provide a simple, cost-effective, and reliably replaceable replacement liner for insertion in a conveyor pan of a chain type conveyor.

This objective is solved by means of a replacement liner for insertion in a conveyor pan of a chain type conveyor with the features of claim 1, a conveyor pan with the features of claim 11, a chain type conveyor with the features of claim 14, liner replacement method with the features of claim 15, and a liner sheet for a chain type conveyor with the features of claim 16. Preferred embodiments are set forth in the present specification, the Figures as well as the dependent claims.

Accordingly, a replacement liner for insertion in a conveyor pan of a chain type conveyor is provided. The replacement liner comprises a floor part having a left connection surface and a right connection surface, a left side part having a left side part connection surface connectable to the left connection surface, and a right side part having a right side part connection surface connectable to the right connection surface. The connection surfaces are configured to form, in a connected state, a form-fitted connection with their complementary connection surface.

Furthermore, a conveyor pan for a chain type conveyor is provided, comprising a pan body and such a replacement liner.

In addition, a chain type conveyor is provided, comprising a first end having a drive unit, a conveyor chain, and at least one conveyor pan, wherein the drive unit is configured to drive the conveyor chain across the at least one conveyor pan in a conveying direction.

Process-wise, a liner replacement method for replacing the liner of a conveyor pan is provided. The method comprises the steps of unmounting the left side part and the right side part from the conveyor pan, finding the floor part in a lose configuration, and replacing the lose floor part, the left side part and/or the right side part.

In addition, a liner sheet for a chain type conveyor is provided. The liner sheet comprises a lining surface delimited by a left side having a left liner sheet connection surface and by a right side having a right liner sheet connection surface. The left liner sheet connection surface and/or the right liner sheet connection surface are configured as form-fit connection surfaces.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
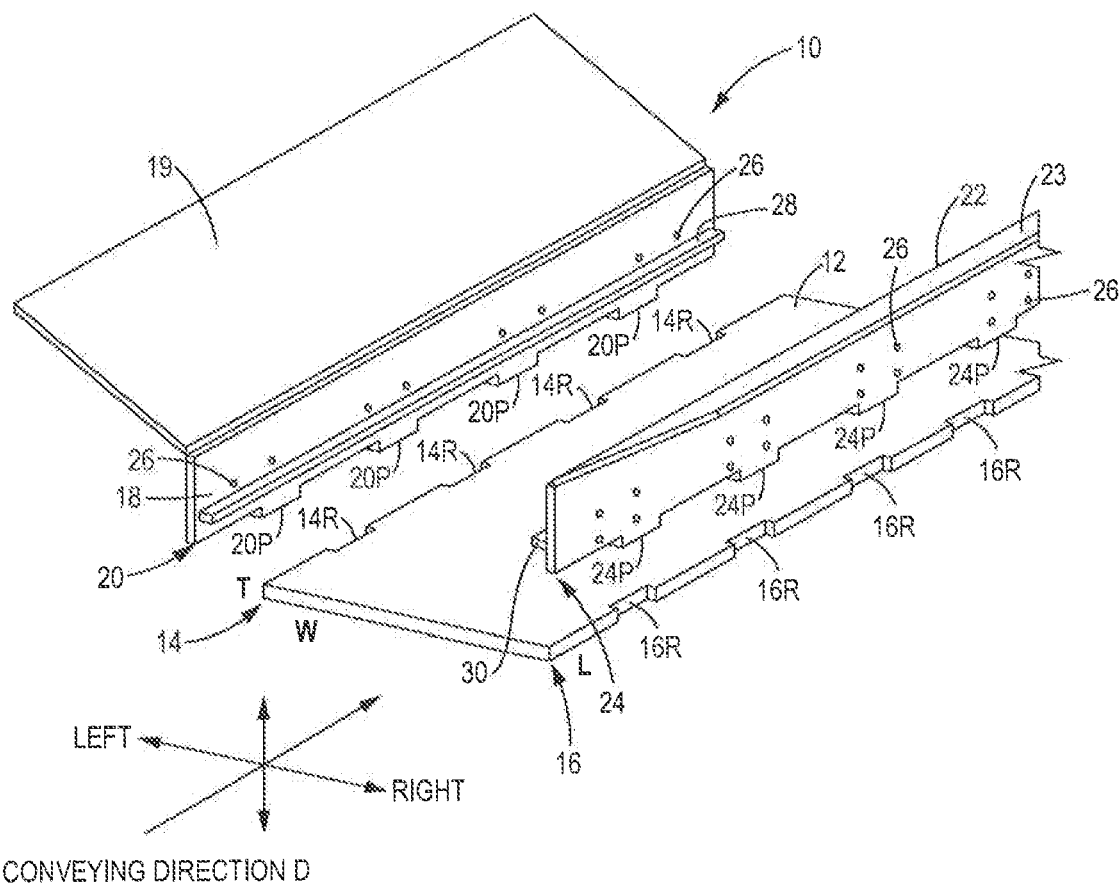
FIG. 1 schematically discloses a replacement liner in an exploded view according to an embodiment.

In the following, the invention will be explained in more detail with reference to the accompanying Figures. In the Figures, like elements are denoted by identical reference numerals and repeated description thereof may be omitted in order to avoid redundancies.

The present disclosure is generally directed towards a replacement liner to be inserted in a conveyor pan of a chain type conveyor as it is used in the mining industry. While the conveyors or conveyor segments disclosed in the following may be similar or related to gate conveyors or face conveyors used underground, the herein discussed conveyors are assumed to have pans rigidly connected to one another.

In the following, the directions "left" and "right" are to be understood relative to the conveying direction. However, exemplary embodiments are not limited thereto, and left and right directions may also be switched. At the same token, the conveying direction may be different than indicated in the present disclosure. Finally, all components of the conveyor optional in the context of the present disclosure, for example the conveyor chain or the end segments of the conveyor may be interchanged, omitted, or replaced by further components.

In FIG. 1, an exploded view of a replacement liner 10 according to an embodiment of the present disclosure is shown. The conveying direction D may for example be defined from the lower left corner to the upper right corner as indicated by the arrow. Likewise, the directions "left" and "right" may be defined as indicated by the arrows.

The replacement liner 10 is configured for insertion in a conveyor pan (not shown in FIG. 1) of a chain type conveyor (not shown in FIG. 1). The replacement liner 10 comprises a floor part 12 having a left connection surface 14 and a right connection surface 16. Further, the replacement liner 10 comprises a left side part 18 having a left side part connection surface 20 connectable to the left connection surface 14, and a right side part 22 having a right side part connection surface 24 connectable to the right connection surface 16. The connection surfaces 14, 20, 16, 24 are configured to form, in a connected state, a form-fitted connection with their complementary connection surface 14, 20 and 16, 24, respectively. In the shown illustration, the connection surfaces are not in a connected state. However, the illustration aims to give a clear understanding of how the floor part 12, the left side part 14, and the right side part 16 shall be assembled, thereby forming the form-fitted connection according to the present disclosure.

Accordingly, complementary connection surfaces are the connection surfaces of two parts to be connected to one another. In addition, a connection surface shall be understood as the surface, or the multitude of surfaces, on a given component designed to meeting their complementary counterpart connection surface in a connected state, thereby forming a connection surface pair.

A form-fitted connection in the sense of the present disclosure may be achieved if a part is held in place by its adjacent part or parts via form-fit. What is meant by that can be explained on the example of the illustration provided in FIG. 1. Therein, the floor part 12 is a plate having an essentially rectangular shape with a length L in the conveying direction, a width W in the left-right direction and a thickness T in the vertical direction.

The left connection surface 14 of the floor part 12 may comprise a recess 14R, or, as shown, four recesses 14R. Its complementary connection surface 20 may comprise a complementary protrusion 20P, or, as shown, four complementary protrusions 20P.

Likewise, the left connection surface 16 of the floor part 12 may comprise a recess 16R, or, as shown, four recesses 16R. Its complementary connection surface 24 may comprise a complementary protrusion 24P, or, as shown, four complementary protrusions 24P.

Accordingly, the left connection surface 14 of the floor part 12 may be comprised of both upward-facing surfaces and left-facing surfaces (where the left side part 18 touches the floor part 12).

In a connected state, when the floor part 12 is connected to the left side part 18 and the right side part 22, a form-fitted connection is formed. As an example, a force applied to the floor part 12 in the conveying direction D creates a reaction force in those surfaces of the protrusions 20P and 24P that are facing the conveying direction, thereby arresting the floor part 12 in place.

The left connection surface 14 of the floor part 12 and the left side part connection surface 20 may be configured to form, in a connected state, a notched configuration, as shown in the illustration provided in FIG. 1. In other words, each recess 14L of the floor part connection surface 14 can be brought into contact with its complementary protrusion 20P along three contact surface pairs. The same may applies to the right connection surface 16 and its complementary right side part connection surface 24, respectively.

Alternatively, according to an embodiment not shown in FIG. 1, instead of the notched connection, the connection surfaces 14, 20, 16, 24 are configured to form, in a connected state, a mortised connection with their complementary connection surface 14, 20; 16, 24.

The left side part 18 and the right side part 22 of the replacement liner 10 may be identical in shape. Further, the connection surfaces 14, 20, 16, and 24 may be configured such that the left side part 18 and the right side part 22 may be interchanged. Following this approach, only one side part design must be produced, ready to be installed on either side of the replacement liner.

According to an alternative not shown in FIG. 1, the left side part 18 and the right side part 22 may have a different geometry, or the connection surfaces 14, 20, 16, and 24 may be configured such that the left side part 18 and the right side part 22 cannot be interchanged, rendering them as a definite left or right side part 18 or 22.

The left side part 18 and the right side part 22 may further comprise mounting means 26 for mounting the side parts 18, 22 on a conveyor pan (not shown in FIG. 1). The mounting means 26 comprise several through-holes provided on each side part 18, 22.

The floor part 12, the left side part 18 and the right side part 22 may have a surface hardness of ≥400 HBW10/3000, preferably a surface hardness of 400 HBW10/3000≤x≤600 HBW10/3000, according to the standardized hardness test used to obtain the Brinell hardness as for example defined in ASTM E10-14 and ISO 6506-1:2005. This may for example be achieved by providing said parts in an abrasion resistant steel. Alternatively, abrasion resistant plastic materials or other materials could be used instead.

In a mounted state, the floor part 12, the left side part 18, and the right side part 22 may have a substantially U-shaped cross-section in a plane orthogonal to the conveying direction D, at least partly, for example along a section which will be inside the conveyor pan (not shown in FIG. 1).

Further, the left side part 18 may comprise a baffle plate 19. The baffle plate 19 may for example be mounted to a surface opposite its left side part connection surface 20. The baffle plate 19 may be aligned in a V-shaped configuration in a plane orthogonal to the conveying direction D. Likewise, the right side part 22 may comprise a baffle plate 23. The baffle plate 23 may for example be mounted to a surface opposite its right side part connection surface 24. The baffle plate 23 may be aligned in a V-shaped configuration in a plane orthogonal to the conveying direction D.

The left side part 18 and the right side part 22 may further comprise a spacer bar 28 and 30, respectively. The spacer bars 28, 30 may be configured such that in a mounted state, a vertical clearance is left between the upper surface of the floor part 12 and the spacer bars 28, 30.

Figure 2:
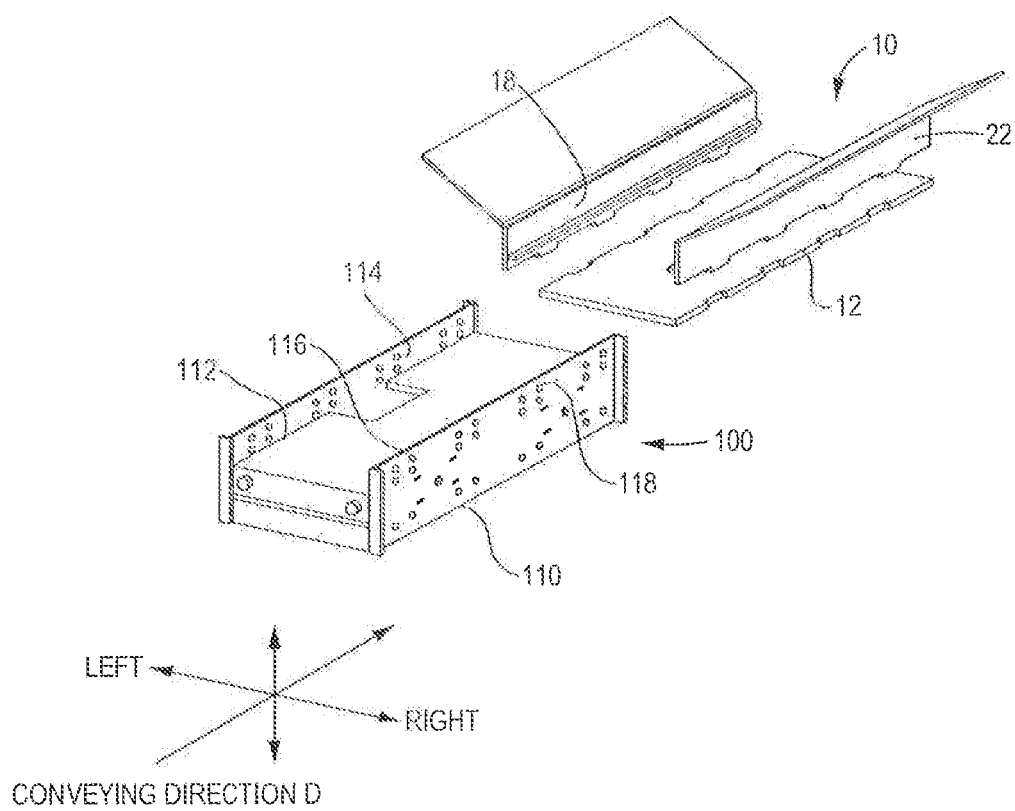
FIG. 2 schematically discloses a conveyor pan in an exploded view according to an embodiment.

FIG. 2 shows a conveyor pan 100 for a chain type conveyor (not shown in FIG. 2) according to an embodiment in an exploded view. The conveyor pan 100 may be understood as one out of several identical or different segments of a chain type conveyor. The replacement liner 10 discussed in the context of FIG. 2 is identical to the replacement liner 10 of FIG. 1.

The pan body 110 may comprise a bottom surface 112, a left side surface 114, and a right side surface 116. Those surfaces may be provided facing the inside of the conveyor pan 100. The left and right side surfaces 114, 116 may comprise conveyor pan mounting means 118 to mount the left and right side parts 16, 22 of the replacement liner 10 thereon. More specifically, the conveyor pan mounting means 118 may engage with the mounting means 26 of the replacement liner 10. To this end, the mounting means 26, 118 may further comprise a bolt, a screw or the like.

Mounted to the left side surface 114 and the right side surface 116, the replacement liner 10 may be fixed to the conveyor pan 100 only on those sides via the mounting means. To this token, the floor part 12 may be held in place vertically by the bottom surface 112 from below and by the side parts 18 and 22 from above.

In the directions along and against the conveying direction D, the floor part 12 of the replacement liner 10 may be held in place only via the form-fitted connection formed between the floor part 12 and the left side part 18 as well as the form-fitted connection formed between the floor part 12 and the right side part 22.

In the directions left and right, the floor part 12 of the replacement liner 10 may be held in place only via the form-fitted connection formed between the floor part 12 and the left side part 18 as well as the form-fitted connection formed between the floor part 12 and the right side part 22. Alternatively, the floor part 12 may further be held in place by the left side surface 114 in the left direction and by the right side surface 116 to the right direction.

Figure 3:
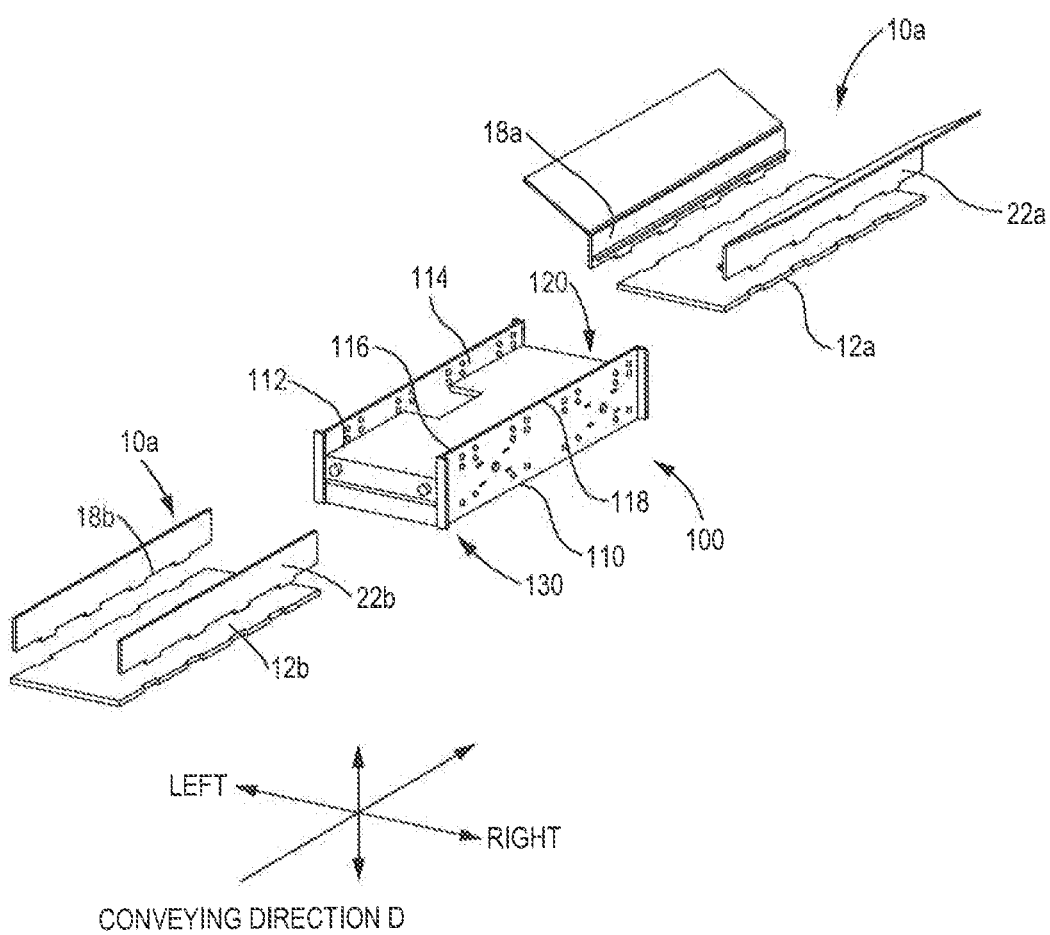
FIG. 3 schematically discloses a conveyor pan in an exploded view according to another embodiment.

FIG. 3 shows a conveyor pan 100 for a chain type conveyor (not shown in FIG. 3) according to another embodiment in an exploded view. Similar to FIG. 2, the conveyor pan 100 may be understood as one out of several identical or different segments of a chain type conveyor.

The conveyor pan 100 comprises a pan body 110 and two replacement liners 10 according to the disclosure discussed herein, in the following referenced by a first replacement liner 10a and a second replacement liner 10b. The first replacement liner 10a may be identical to the replacement liner 10 discussed in FIGS. 1 and 2. In other words, the illustration shown in FIG. 3 may be understood as the illustration shown in FIG. 2, yet with an additional replacement liner 10, herein referenced by second replacement liner 10b. Unless stated or represented otherwise, the disclosure directed to the replacement liner 10 in the context of FIGS. 1 and 2 also applies to the second replacement liner 10b as shown in FIG. 3.

The conveyor pan 100 shown in FIG. 3 may comprise a top race 120 and a bottom race 130. The first replacement liner 10a may be mounted to the top race 120. The second replacement liner 10b may be mounted to the bottom race 130 of the conveyor pan 100.

The pan body 110 may comprise a bottom surface 112 for the top race 120, a left side surface 114, and a right side surface 116. The left side surface 114 and the right side surface 116 may extend from the top race 120 to the bottom race 130. Those surfaces may be provided facing the inside of the conveyor pan 100 for both the top race 120 and the bottom race 130. The left and right side surfaces 114, 116 may comprise conveyor pan mounting means 118 to mount the left and right side parts 16, 22 of the first replacement liner 10a to the top race 120 and to mount the left and right side parts 16b, 22b of the second replacement liner 10b to the bottom race 130. More specifically, the conveyor pan mounting means 118 may engage with the mounting means 26 of the first and second replacement liners 10a and 10b. To this end, the mounting means 26, 118 may further comprise a bolt, a screw, or the like.

In the directions along and against the conveying direction D, the floor parts 12a, 12b of the first and second replacement liners 10a, 10b may be held in place only via the form-fitted connection formed between the floor parts 12a, 12b and the left side parts 18a, 18b as well as the form-fitted connection formed between the floor parts 12a, 12b and the right side parts 22a, 22b, respectively.

In the directions left and right, the floor part 12 of the first and second replacement liners 10a, 10b may be held in place only via the form-fitted connection formed between the floor parts 12a, 12b and the left side parts 18a, 18b as well as the form-fitted connection formed between the floor parts 12a, 12b and the right side parts 22a, 22b. Alternatively, the floor parts 12a, 12b may further be held in place by the left side surface 114 in the left direction and by the right side surface 118 to the right direction.

Figure 4:
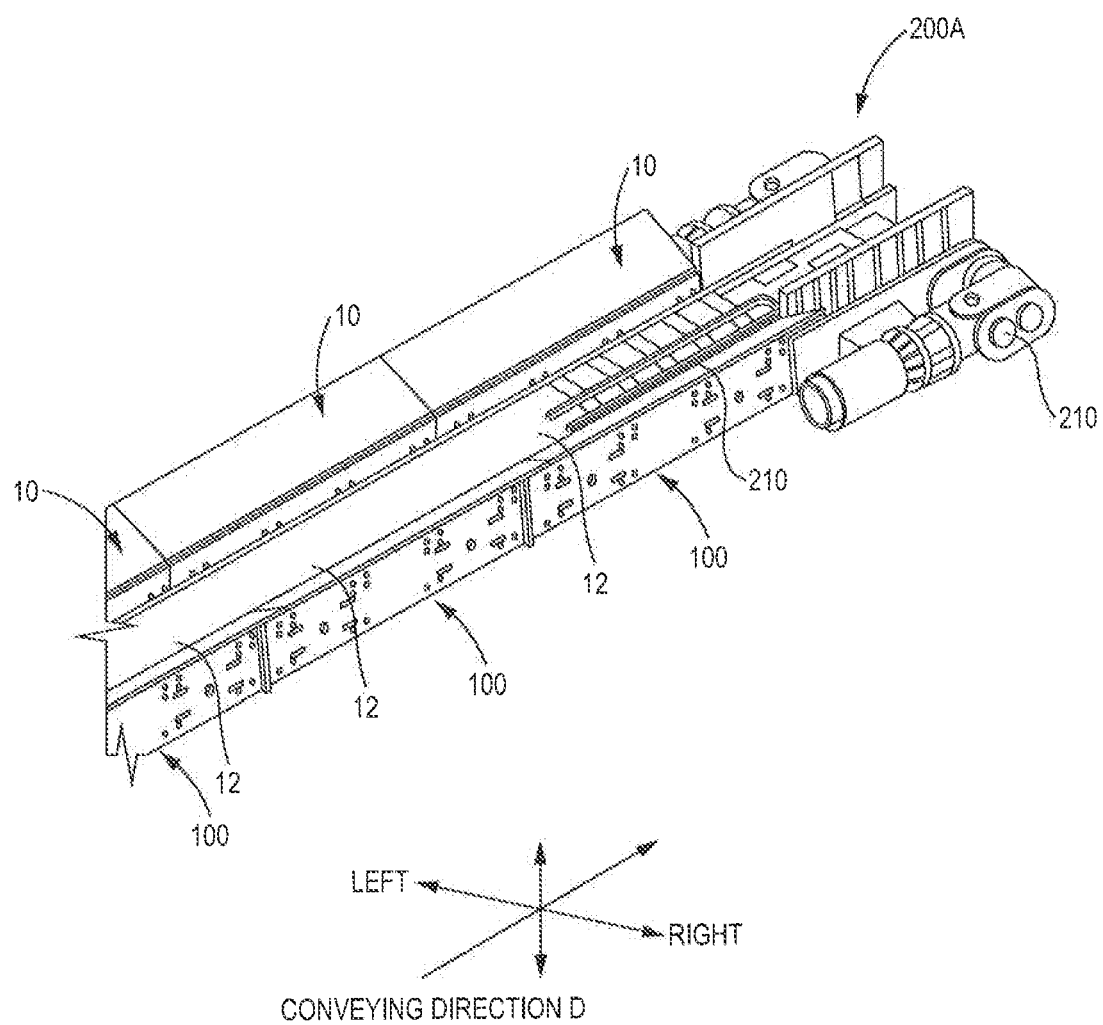
FIG. 4 schematically discloses a first excerpt of a chain type conveyor in a perspective view according to an embodiment.

FIG. 4 shows a first excerpt of a chain type conveyor 200 in a perspective view according to an embodiment of the present disclosure. The chain type conveyor 200 comprises a first end 200A having a drive unit 210, a conveyor chain 220, and at least one conveyor pan 100. The drive unit 210 is configured to drive the conveyor chain 220 across the at least one conveyor pan 100 in a conveying direction D. For simplification purposes, the conveyor chain 220 is only shown partially. The conveyor chain 220 is to be understood as running along the entire length of the chain type conveyor 200, running over all floor parts 12 provided in the top race 120 and back along the entire length of the chain type conveyor 200, running over all floor parts provided in the bottom race (not shown in FIG. 4).

Figure 5:
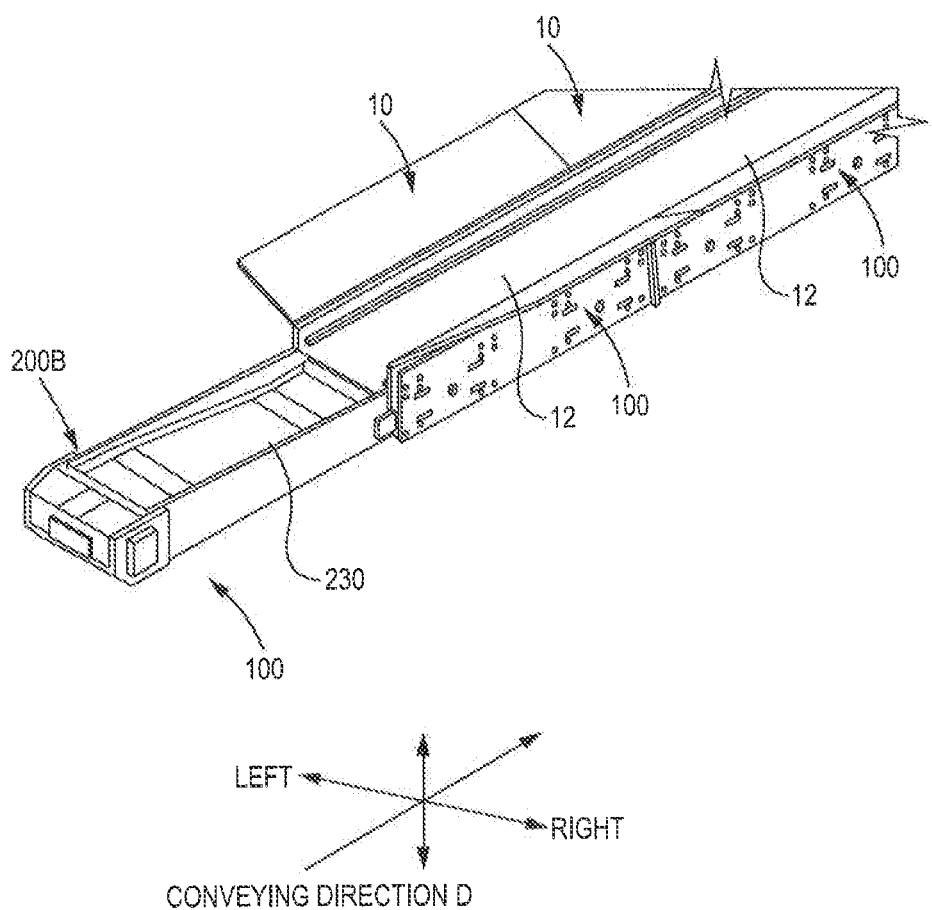
FIG. 5 schematically discloses a second excerpt of the chain type conveyor of FIG. 4 in a perspective view.

FIG. 5 shows a second excerpt of the chain type conveyor 200 according to the embodiment shown in FIG. 4. The chain type conveyor 220 may comprise an overburden section 230 on its second end 200B. Between the first end (shown in FIG. 4) and the second end 200B shown in FIG. 5, a multitude of identical conveyor pans 100 may be provided.

Figure 6:
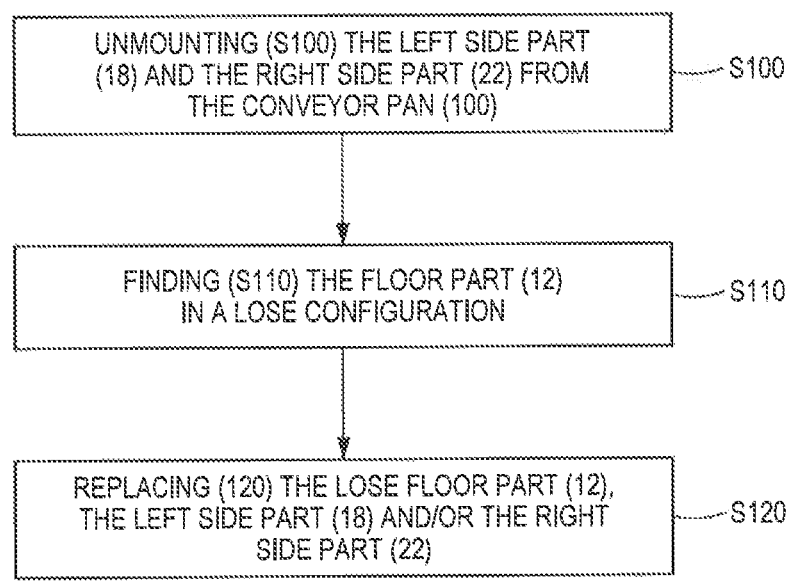
FIG. 6 shows a flow chart of a replacement method according to an embodiment.

FIG. 6 shows a flow chart of a liner replacement method for replacing the liner of a conveyor pan 100 according to an embodiment of the disclosure. Accordingly, the method comprises the steps of unmounting S100 the left side part 18 and the right side part 22 from the conveyor pan 100, finding S110 the floor part 12 in a lose configuration, and replacing S120 the lose floor part 12, the left side part 18 and/or the right side part 22.

Figure 7:
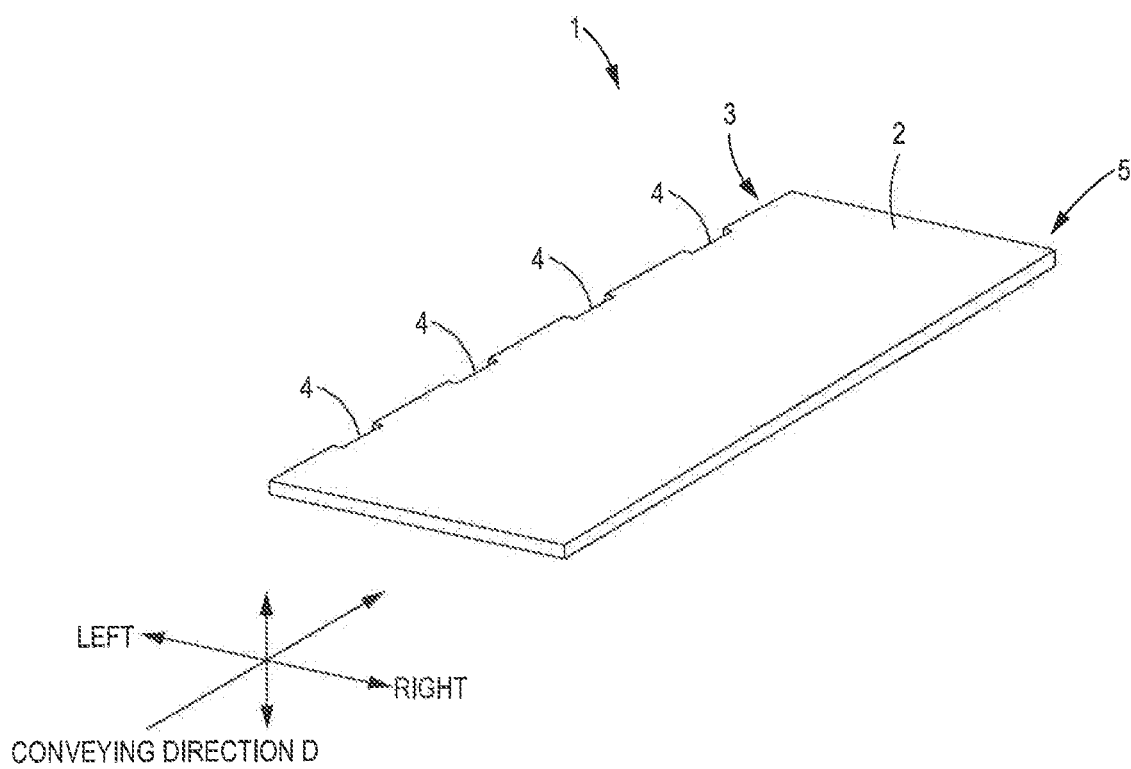
FIG. 7 shows a liner sheet for a chain type conveyor according to an embodiment in a perspective view.

FIG. 7 shows a liner sheet 1 for a chain type conveyor according to an embodiment in a perspective view. The liner sheet 1 comprises a lining surface 2 which is delimited by a left side 3 having a left liner sheet connection surface 4 and by a right side 5 having a right liner sheet connection surface 6. The left liner sheet connection surface 4 is configured as form-fit connection surface.

Where applicable, the same principles and definitions as provided in the context of the replacement liner apply. The lining surface 2 may be understood as a surface suitable for mitigating overburden-driven abrasion in a chain type conveyor or inside a conveyor pan of such a conveyor. For example, the lining surface 2 may have a surface hardness of ≥400 HBW10/3000, preferably ≥600 HBW10/3000. To this end, lining surface may comprise an abrasion resistant steel or plastic material.

The left liner sheet connection surface 4 is configured as a form-fit connection surface. In other words, the liner sheet connection surface 4 is configured such that it provides interlocking surfaces sufficient to holding the liner sheet 1 in place within a conveyor pan when exposed to forces in the direction of the conveying direction D. Such forces may for example be forces inflicted due to a conveyor chain (not shown in FIG. 7) and forces inflicted due to overburden being dragged over and along the lining surface 2.

According to an alternative not shown in FIG. 7, instead of the left liner sheet connection surface 4, the right liner sheet connection surface 6 can be configured as form-fit connection surface.

Figure 8:
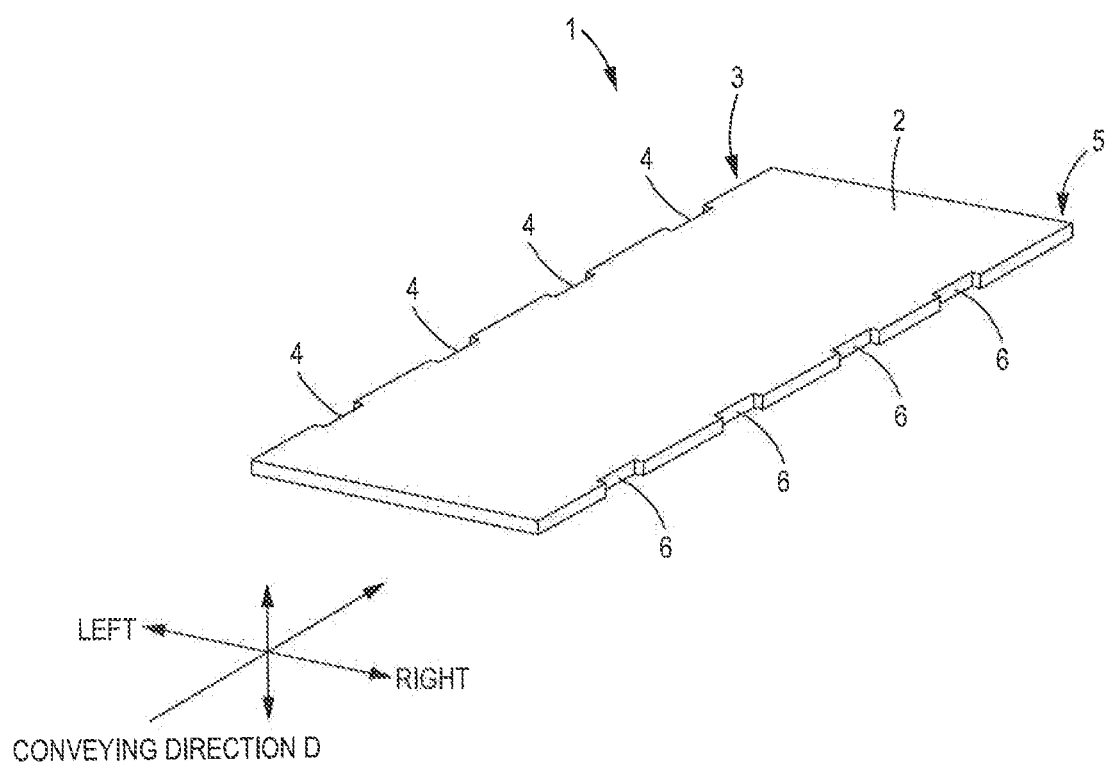
FIG. 8 shows a liner sheet for a chain type conveyor according to another embodiment in a perspective view.

FIG. 8 shows a liner sheet 1 for a chain type conveyor in a perspective view according to another embodiment of the liner sheet. According to this embodiment, the lining surface 2 is also delimited by a left side 3 having a left liner sheet connection surface 4 and by a right side 5 having a right liner sheet connection surface 6. The shown embodiment differs from the embodiment of FIG. 7 in that the left liner sheet connection surface 4 and the right liner sheet connection surface 6 are configured as form-fit connection surfaces. Both form-fit connection surfaces are surfaces configured such that they provide interlocking surfaces sufficient to holding the liner sheet in place as defined above in the context of FIG. 7.

The embodiment of the liner sheet 1 as shown in FIG. 8 is further suitable for being used as a floor part 12 in a replacement liner 10. Preferably, this embodiment of the liner sheet 1 is identical to a floor part 12 as disclosed in the context of the replacement liner 10.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and all features mentioned before in any technically feasible combination. As an example, a replacement liner may have more interlocking parts, forming a form-fitted connection. Likewise, each part may have more than one connection surface connectable to its complementary connection surface to form a form-fitted connection.

A replacement liner for insertion in a conveyor pan of a chain type conveyor may be provided, comprising a floor part having a left connection surface and a right connection surface, a left side part having a left side part connection surface connectable to the left connection surface, and a right side part having a right side part connection surface connectable to the right connection surface. The connection surfaces are configured to form, in a connected state, a form-fitted connection with their complementary connection surface.

In the context of the present disclosure, complementary surfaces are surfaces which are meant to form a connected surface pair when the replacement liner is in a connected, or assembled state.

In the context of the present disclosure, any directions or relative positions or orientations, in particular "left", "right", "conveying direction", "above", "below", "top", "bottom" or the like are exemplarily used to explain the technical teaching without delimiting the disclosure.

In the context of the present disclosure, a form-fitted connection may be understood as an interlocked connection. For example, a form-fitted connection between two components may be assumed if a relative movement of one component in the conveying direction is restricted by the other component due to form-fitted interlocking.

Providing the connection surfaces such that they are configured to form, in a connected state, a form-fitted connection with their complementary connection surface has the advantage of being able to simply remove and replace the replacement liner. Due to the form-fitted connection, the relative positioning between the individual parts is already predetermined by their geometry, thereby rendering a replacement fail-safe, simple, and easy to achieve. In addition, no tools are needed for the connection of such parts.

In a further development, the connection surfaces may be configured to form, in a connected state, a mortised and/or notched connection with their complementary connection surface.

In general, a mortised system has one part going through another part without any necessary fasteners whereas the notched system has a section cut out from one side of a part to allow the other part to set inside.

By providing a mortised and/or notched connection, a multitude of interlocking and potentially form-fitting surfaces pairs may be achieved between two parts of the replacement liners.

In a further development, the left and/or right connection surface of the floor part may comprise a recess and the complementary left and/or right side part connection surface may comprise a complementary protrusion.

Thereby, a simple, cost-effective, and safe connection of individual parts may be achieved.

In a further development, the left side part and the right side part may be symmetrical, interchangeable, and/or identical in shape.

Thereby, production, storage, and replacement costs for a replacement liner may be reduced, as the replacement liner's complexity is further reduced.

In a further development, the connection surfaces may be configured such that the left side part and the right side part cannot be interchanged, or wherein the corresponding connection surfaces are configured such that the left side part and the right side part can be interchanged.

Configuring the connection surfaces such that the left side part and the right side part cannot be interchanged has the advantage of being able to predetermine different connection surface designs for a given side and at the same time inherently preventing false assembly thereof.

Configuring the connection surfaces such that the left side part and the right side part can be interchanged has the advantage of being able to replace one part facing more abrasion with a part facing less abrasion without the necessity of a new part.

In a further development, the left side part and/or the right side part may comprise mounting means for mounting the side part on a conveyor pan, preferably wherein the mounting means may comprise a through-hole a fastening bolt and/or a screw.

Thereby, a separation of the functions "mounting" and "resisting abrasion" may be achieved in an efficient manner. The floor part, facing the most abrasion, may only fulfil the function "resisting abrasion" by providing an abrasion resistant surface while being held in place in a form-fitted manner by its interlocked side parts. The side parts, facing less abrasion, may fulfil the function "mounting" by comprising the mounting means for mounting the side parts on or to the conveyor pan. This approach allows a longer and safer service life of the replacement liner. Also, this approach allows a better inspection of the mounting means which are provided on the sides above the floor plate, hence, at a position less likely to be covered with overburden.

In a further development, the floor part, the left side part and/or the right side part may have a surface hardness of ≥400 HBW10/3000, preferably wherein the floor part, the left side part, and/or the right side part may comprise an abrasion resistant steel or plastic material.

Thereby, the replacement liner may be suitable for applications of conveying even highly abrasive materials such as sand, shells, hard rocks, or the like. This approach allows to utilize or upgrade existing chain type conveyors which are normally not designed for such materials by simply adding the replacement liner according to the present disclosure.

In a further development, in a state mounted inside of the conveyor pan, the floor part, the left side part, and the right side part may substantially have a U-shaped cross-section in a plane orthogonal to a conveying direction.

Thereby, the volume of overburden to be conveyed may be increased while at the same time, maintaining a simple, cost-effective, and safe to maintain replacement liner design. For example, the U-shaped cross-section may be designed large enough to consume a 45 ton dump truck load.

In a further development, the left side part and/or the right side part may further comprise a baffle plate, preferably mounted to a surface opposite its left and/or right side part connection surface, respectively, preferably wherein the baffle plates may be aligned in a V-shaped configuration in a plane orthogonal to the conveying direction.

Thereby, the replacement liner may be designed such that it is able to withstand a sudden 45 ton dump truck load discharge and to feed said discharge gradually into the chain type conveyor without experiencing undue spillage, abrasion, or failure.

In a further development, the left side part and/or the right side part may further comprise a spacer bar.

Thereby, the transport of overburden travelling along the conveyor pan can be enhanced due to less dead zones in the corners of the conveyor pan.

A conveyor pan may be provided, comprising a pan body and a replacement liner according to the present disclosure.

Such a conveyor pan has the advantage of being able to modularly combine several such conveyor pans to one chain type conveyor. At the same time, spots of high abrasion can be repaired locally by replacing the replacement liner only in conveyor pans affected by the observed abrasion. In addition, a already installed chain type conveyor may be adjusted in length conveniently by adding or removing one or more such conveyor pans. Thereby, a cost-effective, safe, and easy to maintain chain type conveyor for highly abrasive overburden may be produced, assembled on-site, operated, and maintained.

In a further development, the pan body may further comprise a bottom surface, a left side surface, and a right side surface, wherein the left and/or right side surfaces may comprise conveyor pan mounting means configured to mount the left and/or the right side parts thereon.

Thereby, a separation of the functions "mounting" and "resisting abrasion" may be achieved in an efficient manner. The floor part, facing the most abrasion, may only fulfil the function "resisting abrasion" by providing an abrasion resistant surface while being held in place in a form-fitted manner by its interlocked side parts. The side parts, facing less abrasion, may fulfil the function "mounting" by comprising the mounting means for mounting the side parts on or to the left side surface, and/or the right side surface of the conveyor pan. This approach allows a longer and safer service life of the replacement liner. Also, this approach allows a better inspection of the mounting means which are provided on the sides above the floor plate, hence, at a position less likely to be covered with overburden.

In a further development, the conveyor pan may further comprise a top race, a bottom race, and, in addition to the first replacement liner, a second replacement liner according to the present disclosure. The first replacement liner may be mounted to the top race and the second replacement liner may be mounted to the bottom race.

By providing a second replacement liner on the bottom race, abrasive overburden residuals stuck in or on the conveyor chain are not damaging the bottom race. Thereby, a cost-effective, safe, and easy to maintain chain type conveyor for highly abrasive overburden may be produced, assembled on-site, operated, and maintained.

A chain type conveyor may be provided, comprising a first end having a drive unit, further comprising a conveyor chain, and at least one conveyor pan according to the present disclosure. The drive unit may be configured to drive the conveyor chain across the at least one conveyor pan in a conveying direction.

Thereby, a cost-effective, safe, and easy to maintain chain type conveyor for highly abrasive overburden may be produced, assembled on-site, operated, and maintained.

Process-wise, a liner replacement method may be provided for replacing the liner of a conveyor pan of a chain type conveyor, comprising the steps of unmounting the left side part and the right side part from the conveyor pan, finding the floor part in a lose configuration, and replacing the lose floor part, the left side part and/or the right side part.

The step of unmounting the side parts may comprise removing replacement liner mounting means and/or conveyor pan mounting means using tools and/or manual labor.

The step of finding the floor part in a lose configuration may comprise having to use no tools and/or manual labor to further disengage the floor part from the side parts. In the broadest sense, the floor part may simply be transported out of the conveyor pan after the side parts have been unmounted.

The step of replacing the lose floor part, the left side part and/or the right side part may comprise positioning a floor part, interlocking said floor part with side parts to form a form-fitted connection, and mounting the side parts to the conveyor pan, wherein one, some, or all said parts are replacement parts. Thereby, a cost-effective, safe, and easy to maintain chain type conveyor for highly abrasive overburden may be produced, assembled on-site, operated, and maintained.

A liner sheet for a chain type conveyor is provided, comprising a lining surface delimited by a left side having a left liner sheet connection surface and by a right side having a right liner sheet connection surface. The left liner sheet connection surface and/or the right liner sheet connection surface are configured as form-fit connection surfaces.

Referring to the first alternative, a liner sheet for a chain type conveyor with both the left liner sheet connection surface and the right liner sheet connection surface being configured as form-fit connection surfaces is to be understood as a floor part as disclosed herein in the context of the replacement liner. Accordingly, the same advantages, definitions and technical effects apply.

Referring to the second alternative, a liner sheet for a chain type conveyor is provided, the liner sheet having only the left liner sheet connection surface or the right liner sheet connection surface configured as a form-fit connection surface. Thereby, a cost-effective, safe, and easy to maintain liner sheet for highly abrasive overburden may be produced, assembled on-site, operated, and maintained.

In the context of the present disclosure, the liner sheet connection surface being configured as form-fit connection surface is to be understood such that this connection surface provides interlocking surfaces sufficient to holding the liner sheet in place within a conveyor pan when exposed to forces in the direction of the conveying direction. Such forces may for example be forces inflicted due to a conveyor chain and forces inflicted due to overburden being dragged over and along the lining surface. Thereby, a cost-effective, safe, and easy to maintain liner sheet for highly abrasive overburden may be produced, assembled on-site, operated, and maintained.

Accordingly, the technical features each are described in connection with the above liner sheet, replacement liner, the conveyor pan, and the chain type conveyor may also relate and apply to the proposed liner replacement method and vice versa.

INDUSTRIAL APPLICABILITY

With reference to the Figures, a liner sheet, a replacement liner for insertion in a conveyor pan of a chain type conveyor, a conveyor pan, a chain type conveyor, and a liner replacement method for replacing the liner of a conveyor pan of a chain type conveyor are applicable in any suitable conveyor application, in particular in the field of mining, for example in gate conveyors or face conveyors.

In practice, a liner sheet, a replacement liner for insertion in a conveyor pan of a chain type conveyor, a conveyor pan, and a chain type conveyor and/or any combination of these various assemblies and components may be manufactured, bought, or sold to retrofit a conveyor, or an conveyor already in the field in an aftermarket context, or alternatively may be manufactured, bought, sold or otherwise obtained in an OEM (original equipment manufacturer) context.

As alluded to previously herein, the aforementioned embodiments may increase the improve the conveyor durability and longevity as will be elaborated further herein momentarily.

Referring to FIG. 1, there is an embodiment shown disclosing a replacement liner which may be assembled and inserted in a conveyor pan of a chain type conveyor. One skilled in the art will expected various embodiments of the present disclosure will have an improved simplicity, necessitating less maintenance and less complex adjustment technologies for conveyor pans and/or chain type conveyors.

The same advantages apply to the remaining figures, in particular to the conveyor pans shown in FIGS. 2 and 3, to the chain type conveyor comprising the latter as shown in FIGS. 4 and 5, and to the liner replacement method for replacing the liner of a conveyor pan of a chain type conveyor as shown in FIG. 6. In addition, the same advantages apply to the liner sheet as shown in FIGS. 7 and 8.

The present description is for illustrative purposes only and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," "include", "includes", "including", or the like are intended to be open-ended terms. Further, the phrase "based on" is intended to mean "based, at least in part, on" unless explicitly stated otherwise.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

Certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A replacement liner for insertion in a conveyor pan of a chain conveyor, comprising
    a floor part comprising a top surface that includes a left connection surface and a right connection surface,
    a left side part comprising a left side part connection surface and a protrusion, the left side part connection surface connectable to and disposed on the left connection surface, the protrusion oriented to extend outward from the left side part connection surface and transverse to the top surface of the floor part, the protrusion disposed adjacent to the floor part, and
    a right side part having a right side part connection surface connectable to and disposed on the right connection surface of the top surface of the floor part,
    characterized in that
    the left and right connection surfaces are configured to form, in a connected state, a form-fitted connection.

2. The replacement liner according to claim 1, wherein the left connection surface and the right connection surface are configured to form, in a connected state, a mortised and/or a notched connection.

3. The replacement liner according to claim 1, wherein the left and/or the right connection surface of the floor part comprises a recess and the complementary left and/or right side part connection surface comprises a complementary protrusion.

4. The replacement liner according to claim 1, wherein the left side part and the right side part are symmetrical, interchangeable, and/or identical in shape.

5. The replacement liner according to claim 1, wherein the left side part and the right side part are configured to be interchangeable.

6. The replacement liner according to claim 1 wherein each of the left side part and/or the right side part are mountable to a conveyor pan.

7. The replacement liner according to claim 1, wherein the floor part, the left side part and/or the right side part have a surface hardness of >400 HBW10/3000 as measured according to ASTM E10-14 and ISO 6506-1:2005, wherein the floor part, the left side part and/or the right side part comprise an abrasion resistant steel or plastic material.

8. The replacement liner according to claim 1, wherein, in a state mounted inside of the conveyor pan, the floor part, the left side part, and the right side part substantially have a U-shaped cross-section in a plane orthogonal to a conveying direction.

9. The replacement liner according to claim 1, wherein the left side part and/or the right side part further comprise a baffle plate, mounted to a surface opposite its left and/or right side part connection surface, respectively, wherein the baffle plates are aligned in a V-shaped configuration in a plane orthogonal to the conveying direction.

10. The replacement liner according to claim 1, wherein the left side part and/or the right side part further comprise a spacer bar.

11. A conveyor pan for a chain conveyor, comprising a pan body and the replacement liner according to claim 1.

12. The conveyor pan according to claim 11, wherein the pan body further comprises a bottom surface, a left side surface, and a right side surface, wherein the left and/or right side surfaces are mountable the left and/or the right side parts.

13. The conveyor pan according to claim 11, further comprising a top race, a bottom race, and, in addition to the first replacement liner, a second replacement liner according to claim 1, wherein the first replacement liner is mounted to the top race and the second replacement liner is mounted to the bottom race.

14. A chain typo conveyor comprising a first end having a drive unit, further comprising a conveyor chain, and at least one conveyor pan according to claim 11, wherein the drive unit is configured to drive the conveyor chain across the at least one conveyor pan in a conveying direction.

15. A liner replacement method for replacing the liner of a conveyor pan, comprising the steps of
Unmounting the left side part and the right side part from the conveyor pan;
Finding the floor part in a lose configuration; and
Replacing the lose floor part, the left side part and/or the right side part to form the replacement liner according to claim 1.

* * * * *